July 25, 1967          R. D. HAWKINS ETAL          3,333,278

METHOD OF MAKING FREQUENCY RESPONSIVE DEVICE

Filed May 31, 1963          3 Sheets-Sheet 1

INVENTORS
ROBERT D. HAWKINS
THEODORE STINIS

BY

ATTORNEY

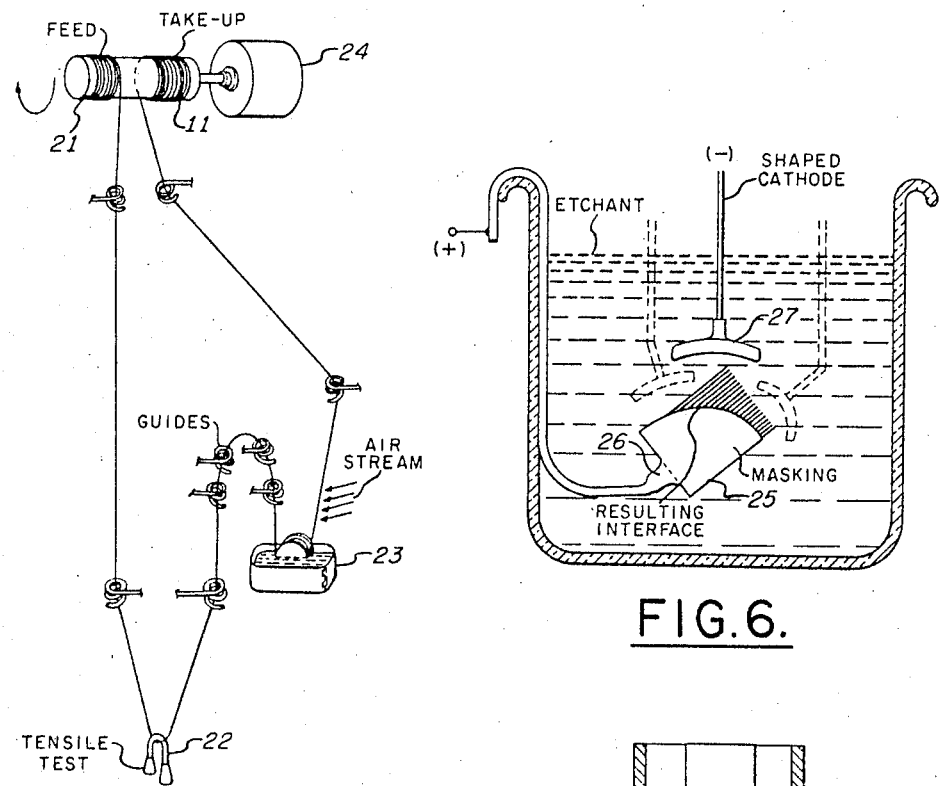
FIG.5.
FIG.6.
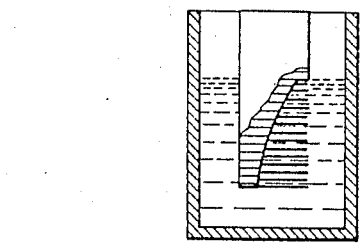
FIG.7.
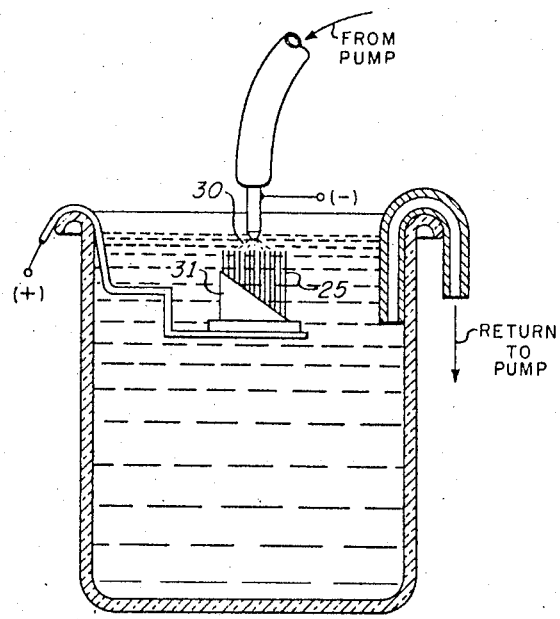
FIG.8.

July 25, 1967 R. D. HAWKINS ETAL 3,333,278
METHOD OF MAKING FREQUENCY RESPONSIVE DEVICE
Filed May 31, 1963 3 Sheets-Sheet 3

INVENTORS
ROBERT D. HAWKINS
THEODORE STINIS
BY
ATTORNEY

United States Patent Office 3,333,278
Patented July 25, 1967

3,333,278
METHOD OF MAKING FREQUENCY
RESPONSIVE DEVICE
Robert D. Hawkins, Greenlawn, and Theodore Stinis,
Hicksville, N.Y., assignors to Sperry Rand Corporation,
Great Neck, N.Y., a corporation of Delaware
Filed May 31, 1963, Ser. No. 285,551
9 Claims. (Cl. 156—155)

This invention relates to the method of making an array consisting of a plurality of energy transmitting elements in which the elements have varying resonant frequencies with respect to each other. The method of the present invention is particularly suitable for producing energy transmitting devices of the fiber optic type, for example, generally of the type shown in U.S. application Ser. No. 185,064 entitled, "Frequency Responsive Apparatus," filed Apr. 4, 1962, in the name of Robert D. Hawkins.

A typical energy transmitting device as produced by the present invention has a large number of tiny light-conductive fibers secured in an opaque member. Each of the fibers has substantially the same light transmission and structural characteristics and each fiber has substantially the same cross-sectional area, preferably elliptical. The fibers are secured in the opaque member in cantilevered fashion in such a manner as to have varying lengths which are free to vibrate at varying resonant frequencies. Cantilevered fibers with elliptical cross-sections have major and minor resonant modes that are a function of the length which each of the fibers protrudes from the support member.

It is therefore an object of the present invention to provide a method of producing an energy transmitting device having an array which is responsive to a plurality of frequencies.

It is a further object of the present invention to provide a method of producing an energy transmitting device having a plurality of coherent elements which are responsive to a plurality of frequencies that define a frequency range.

It is an additional object of the present invention to provide a method of producing an energy transmitting device having a plurality of cantilevered elements supported to resonant at a plurality of frequencies.

These and other objects of the present invention are accomplished by the method of producing a frequency responsive device having a plurality of flexible, energy-transmitting elements which includes the steps of aligning predetermined related axes of said plurality of elements to be substantially parallel with respect to each other, spacing each of said elements with respect to its adjacent elements to permit at least one end of each of said elements to vibrate freely, and securing a portion of each of said elements to form an integral unit having flexible, energy-transmitting elements responsive to a plurality of frequencies.

Referring to the drawings.

FIG. 5 schematically shows a method for coating the fiber with an organic coating;

FIG. 6 shows an anodic etching technique;

FIG. 7 shows an etching method using a programmed insertion rate;

FIG. 8 shows a jet etchant technique; and

Figure 9:
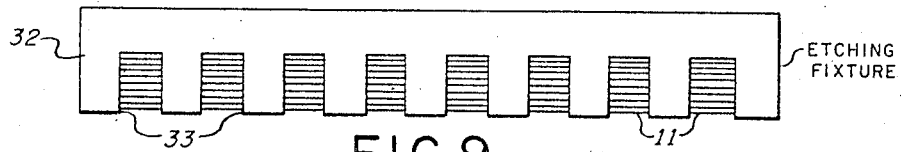
Figure 10:
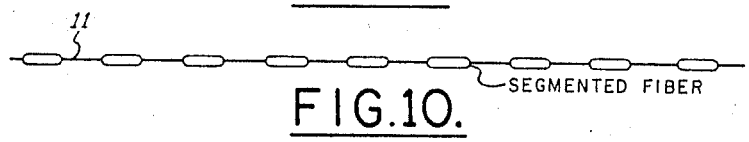
Figure 11:
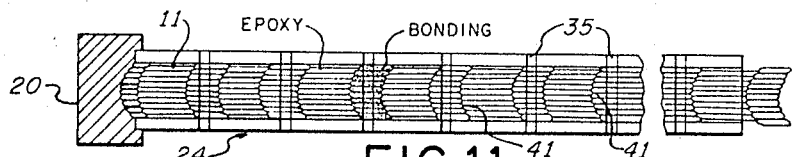
Figure 12:
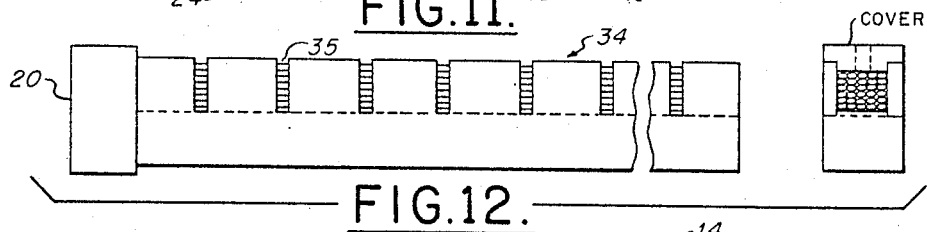

FIGS. 9 to 20 show the steps of producing a plurality of substantially identical arrays using the etching fixture of FIG. 9 and the stacking fixture of FIGS. 11 and 12.

The present invention will be described with respect to a method of producing a frequency responsive array of energy transmitting fibers in which the fibers have an elliptical cross-section and consist of flexible quartz fibers which transmit light. It will be appreciated that the present invention is also suitable for making a frequency responsive array of elements which transmit energy in other ways and involving elements shaped other than elliptically and of a material other than quartz.

Figure 1:
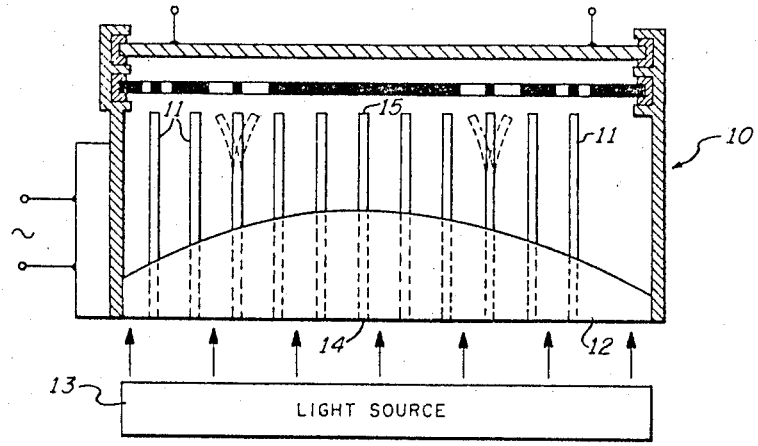
FIG. 1 is a side view partly in section of a typical frequency responsive energy transmitting device produced in accordance with the present invention.

To produce a frequency responsive device 10 of the character shown in FIG. 1, a plurality of light conducting flexible quartz fibers 11 are utilized. The device 10 and the fibers 11 may be of the type described in said U.S. application S.N. 185,064. Preferably, the fibers 11 are clear fused quartz of optical Grade I having an elliptical cross-section. The elliptical shape provides each of the fibers 11 with two distinct resonant characteristics when cantilevered in a manner to be explained. The quartz fibers 11 may be obtained in the form, for example, of a continuous spool.

In the finished product, the fibers 11 are mounted in a support member 12 in order that the fibers 11 extend beyond the member 12 in cantilevered fashion with the exposed portions free to vibrate. In the embodiment shown in FIG. 1, the fibers 11 extend through the support member 12 in order that light, as indicated at 13 is conducted from one end 14 of each of the fibers 11 to the other end 15. The fibers 11 have varying free lengths which extend beyond the support member 12 in order that when the support member 12 is vibrated, the fibers 11 will respond in accordance with their respective varying resonant frequencies to vibrate as indicated by the dotted lines in the manner taught in the aforementioned application. The support member 12 is composed of opaque material in order that the light 13 is transmitted, in the absence of vibration, through the parallel paths defined by the fibers 11 which have their respective longitudinal axes parallel with respect to each other in order to provide an output signal when operated in accordance with the teachings of said U.S. application S.N. 185,064.

To produce a device 10, the quartz fiber 11, which is assumed to have been provided in spool form, may be continuously coated with a copper film by passing the fiber 11 through a conventional copper plating process which consists of cleaning, activating, depositing a layer of silver, rinsing and then copper plating the fiber 11.

The thickness of the copper plating on the fibers 11 is dependent upon the desired spacing of the fibers 11 with respect to each other in the finished device 10. When the fibers 11 are stacked together in a subsequent step, it is this thickness which determines the spaced relation between the fibers 11. The thickness of the coating must be sufficient to permit the cantilevered ends 15 of the fibers 11 to vibrate freely without interfering with any of the adjacent fibers 11 within the desired amplitude of vibration. For example, when using a quartz fiber 11 having an elliptical cross-section of .002" x .003", a copper coating .003" thick has been found to be satisfactory. As will be explained later, the coating may be other than metallic when the fiber 11 is of the type which conducts the energy along its longitudinal axis. Alternative coating procedures will be described subsequently.

Figure 2:
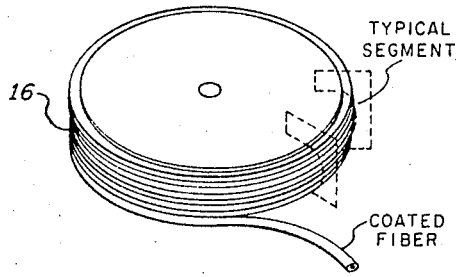
FIG. 2 shows a continuous spool of a coated fiber being cut into a plurality of shorter fibers.
Figure 3:
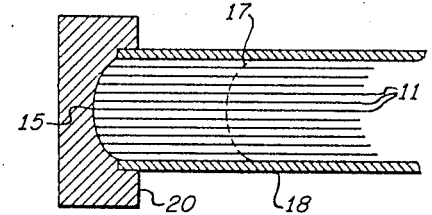
FIG. 3 shows the fibers stacked in a stacking fixture.

After coating, the fibers 11 are cut into convenient lengths, for example, a plurality of the coated fibers 11 may be cut to the same length from a continuous spool 16 as shown in FIG. 2. The cut fibers 11 are then stacked in a stacking fixture 18 as shown in FIG. 3. When the fibers 11 are being stacked, their longitudinal axes are aligned substantially parallel with respect to each other, and the fibers 11 are arranged substantially contiguously along their coated lengths. The fibers 11 may be arranged with all of their ends 14 and 15 beginning and terminating in two parallel planes or as shown in FIG. 3 one end, for example, 15 may be placed against a contoured template 20 in order that the extremities of the fibers 11 assume a predetermined contour in accordance with the desired frequency distribution to which the device 10 is to be responsive.

Prior to stacking, the coated fibers 11 may have predetermined portions of the coating along their respective lengths etched away by conventional means or by means to be explained in order that the stack of aligned fibers 11 has a desired internal inter-face 17 which defines the desired predetermined contour.

In any event, the stack of aligned fibers 11 is then fused into an integral unit. This may be accomplished by plating a fusing material on the original coating which will readily fuse to fill the interstices when subjected to an elevated temperature. For example, a low melting point metal such as indium may be plated on the coating to a predetermined thickness, e.g., .0005", and then the stacked fibers 11 are brought up to the melting point of indium whereupon the stacked fibers 11 fuse into essentially a solid mass.

Figure 4:
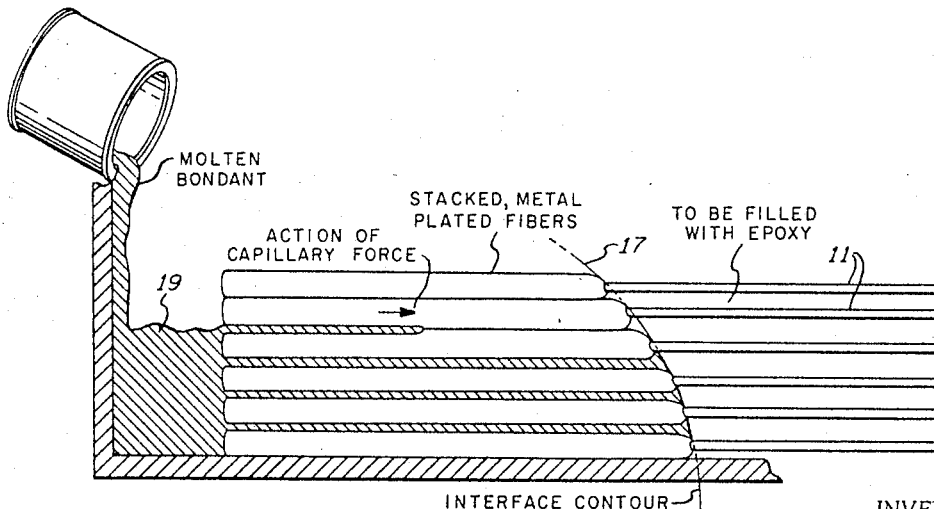
FIG. 4 shows filling the interstices of the fibers with a molten metal.

Alternatively, as shown in FIG. 4, the interstices of the coated stacked fibers 11 may be filled with a molten metal 19, such as indium or solder, to form the coated portion of the aligned fibers 11 into an integral unit. The bonding material must enter all the spaces formed between all the stacked fibers 11 and cease to flow at the desired inter-face 17. With a flux applied to the coated portion of the fibers 11, the low melting point indium flows easily by capillary action within the interstices of the stacked fibers 11 and not being able to "wet" the nonmetallic exposure portions of the fibers 11, it stops naturally at the internal boundary 17 as desired. This coating is readily removed by etching. Then the exposed portions of the fibers 11 may be impregnated by epoxy to form the stacked fibers 11 along their entire lengths into an integral unit.

Another method of fusing the coated fibers 11 into an integral stack is by the use of an organic coating in lieu of the aforementioned metallic coating. As shown in FIG. 5, the organic coating is applied by feeding the continuous spool quartz fiber 11 from the spool 21 and guiding it through a looped circuit to a combination tension regulating, slack gathering and tensile testing weight 22. The quartz fiber 11 is passed through a plastic wax coating bath 23 consisting of, for example, a paraffin base wax comprising paraffin wax and chlorinated terphenyl such as obtainable from the Standard T Chemical Company as their 210 107 Wax mixed 100 parts by weight that is extended with a vinyl resin comprising vinyl acetate-ethylene copolymer such as Dupont Elvax 220 mixed 30 parts by weight. The bath is controlled to a temperature of approximately 277° F. at draw speed of about 3 to 4 feet per minute. The coated fiber 11 is solidified by passing an air stream thereover and then wound upon a take-up portion of the spool 21 that is rotated by a constant speed motor 24. The advantages of the organic coating technique include (a) the organic coating is readily soluble in common solvents and thus can be removed readily, (b) the melting point of the organic coating is broad enough to allow gradual fusing of the stacked fibers 11 without the addition of any filler material, (c) the thickness of the coating can be easily controlled, (d) flexibility, and (e) uniformity.

The fibers 11 in the integral unit are now cut and lapped in order that the ends 14 and 15 of the fibers 11 are flat optical surfaces which permit light to be transmitted from the end 14 through the fiber 11 and transmitted from the end 15. This may be accomplished by conventional cutting and lapping techniques in which the open faces of the integral unit are kept in alignment as the cutting and lapping is accomplished.

In order to render the fibers 11 frequency responsive to a plurality of desired frequencies, they must have portions along their respective lengths free to vibrate in the manner of tiny cantilevered beams. In order to do this the material between the fibers 11 throughout the portion which is to be free and cantilevered must be removed. In the case of metal plated fibers, this may be accomplished by anodically etching or by chemically etching away portions of the material between the fibers 11, as shown in FIG. 6, to provide fibers 11 having varying free cantilevered lengths responsive to varying frequencies. This is accomplished by first securing the metallic section of the prospective array 25 to a mechanical support 26 which also serves as the required positive electrical contact. The array 25 is immersed in a suitable etchant such as 50% nitric acid or 20% sulphuric acid solutions while being made the anode (+). The cathode 27 (−) is positioned in place as typified in FIG. 5. The successive positioning of shaped cathodes 27 according to a predetermined schedule establishes the internal shape of the array, i.e. the resultant etch front.

Alternatively, the material between the fibers 11 may be progressively etched away by inserting the device 10 in an etchant solution at a programmed insertion rate as shown in FIG. 7. For example, by lowering the prospective array 25 in a solution of 50% nitric acid with accompanying solution agitation.

Another alternative method to remove the material between the fibers 11 is by means of a jet etchant technique as shown in FIG. 8 in which a cathodic jet 30 of etching solution such as described above is squirted against the device 10 at a constant rate but changed in position at a progammed rate to remove a predetermined amount of material. The cathode is not only of a particular shape but it is arranged such that a high velocity stream of etchant 30 is directed from it to the eroding face of the array 25. The desired internal array contour 31 is arrived at by superpositioning this impinging etching jet 30 in a progressive manner. Satisfactory etchant acids include a 50% nitric acid solution or a 20% sulphuric acid solution.

By controlling the amount of material removed by any of the aforementioned methods, any desired contour 31 may be etched in the array 25 thereby providing the fibers 11 with varying free, cantilevered lengths to vibrate at varying resonant frequencies.

An alternative process which lends itself to mass production techniques involves cutting the coated quartz fibers 11 into lengths many times the length necessary for one device 10 and placing these coated lengths parallel to each other in an etching fixture 32 as shown in FIG. 9. The fixture 32 is hinged and consists of two identical mating parts having a plurality of parallel masking clamp portions 33 which securely hold spaced portions of the coated fibers 11. The clamps 33 are spaced in accordance with the desired length of the fibers 11 for each device 10, in order that the portions of the fibers 11 clamped between the portions 33 of the fixture 32 are not etched in the succeeding etching step.

The fixture 32 is then placed in an etching solution consisting of 50% sulphuric or nitric acid solutions and the exposed portions of the coated fibers 11 between the clamps 33 have the coating etched away thereby providing, as shown in FIG. 10, segmented fibers 11 having alternatively coated and uncoated portions. A plurality of the segmented fibers 11 are then placed in a trough-like stacking fixture 34 as shown in FIG. 11 which may have a contoured template 20 against which one extremity of the fibers 11 are placed to provide a desired contour 40 corresponding to the desired frequency distribution of the completed arrays. The segmented portions of the fibers 11 coincide with the desired lengths of the fibers 11 in the finished device 10 such that the fixture 34 has slots 35 therein at spaced intervals which correspond to said lengths for subsequently cutting the segmented fibers 11 into smaller portions to form the individual arrays 36. The segmented fibers 11 are disposed in the fixture 34 with their longitudinal axes aligned and the coated portions thereof contiguously disposed along their lengths and may be secured therein by a cover having suitable openings therein. The fact that all the segmented fibers 11 are identical insures that the arrays 36 made from each batch in the fixture 34 are identical in their internal curvature to the shape of the references contour 40 which defines the curvature of the inter-faces 41 for each of the arrays 36. The inner dimensions of the stacking fixture 34 define the external dimensions of each of the arrays 36 such that each array 36 can be assembled into a surrounding housing interchangeably.

Figure 13:

Each of the coated segments of the fibers 11 are bonded while each of the exposed segments are epoxy impregnated. The bonding of the coated segments may be accomplished as explained previously by using a bonding material that fills the interstices and ceases to flow at the inter-face junction 41 formed by the exposed segments of the fibers 11 or by fusing the coated segments together. After bonding, the exposed segments of the fibers 11 are potted in epoxy resin and the epoxy is cured. The fibers 11 in the stacking fixture 34 now form an integral unit by means of the epoxy and the fused or bonded coating. The integral unit in the fixture 34 is then cut along its length at intervals defined by slots 35 shown more clearly in FIG. 12 to produce a plurality of individual arrays 36 depending upon the length of the fixture 34 and the fibers 11. The individual arrays 36 are removed from the fixture 34 as integral units 36 consisting of alternate areas of plated and epoxy embedded quartz fibers 11 as shown in FIG. 13.

Figure 14:
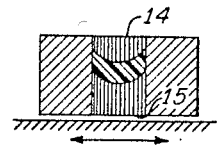
Figure 15:
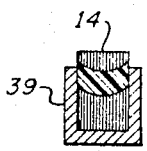
Figure 16:
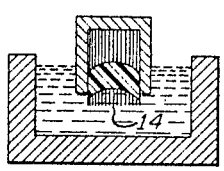
Figure 17:
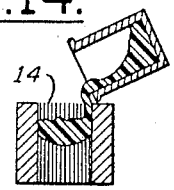
Figure 18:
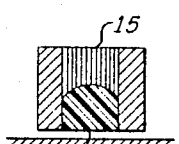
Figure 19:
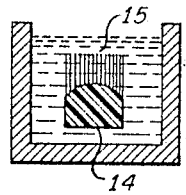
Figure 20:
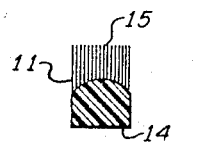

Each of the arrays 36 so formed is then subjected to the following steps. As shown in FIG. 14, the ends 15 forming one end surface are then lapped to final flatness and optical quality. As shown in FIG. 15, the metallized section containing the ends 15 is then masked by coating with a polyvinyl stop-off 39. The metal between the fibers at the end 14 is then removed by etching, as shown in FIG. 16 in one of the previously mentioned etchant baths until this entire metal section is removed, after which epoxy as shown in FIG. 17 is poured into this exposed fiber end 14 to replace the removed metal and thereby secure the ends 14 of the fibers 11. The ends 14 are then lapped flat as shown in FIG. 18 to provide a high optical finish and the masking 39 is removed. The metal remaining between the ends 15 of the fibers 11 is the etched away as shown in FIG. 19 thereby providing a finished array 36 as shown in FIG. 20 having fibers 11 of varying free, cantilevered lengths and having corresponding varying reasonant frequencies. The array 36 is now ready for mounting in the housing of FIG. 1.

It will be appreciated that compatible steps as described above may be used interchangeably to provide a particular sequence of steps depending generally upon the particular requirements of the finished product.

While the invention has been described in its preferred embodiment, it is to be understood that the words which have been used are words of description rather than of limitation and that changes within the purview of the appended claims may be made without departing from the true scope and spirit of the invention in its broader aspects.

What is claimed is:

1. The method of producing an array of energy transmitting fibers in which said fibers have different resonant frequencies to provide an array responsive to a plurality of frequencies, including the steps of
   (a) coating said fibers to a predetermined depth of coating,
   (b) bundling said fibers in order that the longitudinal axes are substantially parallel with respect to each other and said fibers are contiguous along their lengths with respect to adjacent fibers,
   (c) fusing said fibers to form an integral unit,
   (d) cutting said fibers in order that energy may be transmitted from each of said fibers,
   (e) and selectively providing said fibers with varying free lengths in order that said fibers have varying resonant frequencies to provide an array responsive to a plurality of frequencies.

2. The method of producing an array of energy transmitting fibers in which said fibers have different resonant frequencies to provide an array responsive to a plurailty of frequencies, including the steps of
   (a) coating said fibers to a predetermined thickness in accordance with the spacing desired between adjacent elements,
   (b) bundling said fibers in order that their longitudinal axes are substantially parallel with respect to each other and said fibers are contiguous along their lengths with respect to adjacent fibers,
   (c) forming said fibers into an integral unit,
   (d) shaping the extremities of said fibers in order that energy may be transmitted from each of said fibers,
   (e) selectively removing a portion of the material between said fibers in order that said fibers have varying resonant frequencies to provide an array responsive to a plurality of frequencies.

3. The method of producing an array of energy transmitting fibers in which said fibers have different resonant frequencies to provide an array responsive to a plurality of frequencies, including the steps of
   (a) coating said fibers to a predetermined thickness in accordance with the spacing desired between adjacent elements,
   (b) stacking said fibers in order that their longitudinal axes are substantially parallel with respect to each other and said fibers are contiguous along their lengths with respect to adjacent fibers,
   (c) fusing said fibers to form an integral unit,
   (d) cutting the extremities of said fibers in order that energy may be transmitted from each of said fibers,
   (e) selectively removing varying portions of the material between said fibers in order that said fibers have varying resonant frequencies to provide an array responsive to a plurality of frequencies.

4. The method of producing an array of light transmitting fibers in which said fibers have different resonant frequencies to provide an array responsive to a plurality of frequencies, including the steps of
   (a) coating said fibers to a predetermined thickness in accordance with the spacing desired between adjacent fibers,
   (b) cutting a plurality of said coated fibers to a predetermined length,
   (c) stacking said coated fibers into a predetermined shape with their longitudinal axes substantially parallel with respect to each other and said fibers being substantially contiguous with their adjacent fibers along their lengths,
   (d) fusing said coated fibers into an integral unit,
   (e) cutting the extremities of said fibers in order to provide light transmission therefrom,
   (f) and selectively etching varying portions of the material from between said fibers to provide a fiber array having fibers of varying free cantilevered lengths and corresponding resonant frequencies in which said array is responsive to a plurality of frequencies.

5. The method of producing an array of light transmitting fibers in which said fibers have different resonant frequencies to provide an array responsive to a plurality of frequencies, including the steps of
  (a) coating at least a portion of said fibers with a removable film to a predetermined thickness in accordance with the spacing desired between adjacent elements,
  (b) cutting a plurality of said fibers to a predetermined length,
  (c) arranging said fibers to have a predetermined shape with their longitudinal axes substantially parallel with respect to each other and said coated portions of said fibers being substantially contiguous along their coated lengths,
  (d) forming said fibers into an integral unit,
  (e) providing said fibers with flat optically finished ends in order to provide light transmission therethrough, and
  (f) removing varying predetermined portions of the material between said fibers to permit said fibers to vibrate freely in cantileverd fashion at varying resonant frequencies in which said array is responsive to a plurality of frequencies.

6. The method of producing an array of light transmitting glass fibers in which said fibers have different resonant frequencies to provide an array responsive to a plurality of frequencies which define a frequency range, including the steps of
  (a) coating at least a portion of a plurality of light conductive flexible fibers to a predetermined thickness related to the spacing desired between adjacent fibers,
  (b) cutting a predetermined plurality of said fibers to a predetermined length,
  (c) simultaneously shaping, aligning, and spacing said fibers into a predetermined shape with their longitudinal axes substantially parallel with respect to each other and said coated portions of said fibers being substantially contiguous along their coated lengths,
  (d) molding said fibers into an integral unit,
  (e) lapping the ends of said fibers to flat surfaces substantially parallel with respect to each other in order to permit coherent light transmission through said fibers, and
  (f) selectively removing varying portions of the material from between said shaped fibers to provide a fiber array having fibers of varying free cantilevered lengths having corresponding varying resonant frequencies for providing an array responsive to a plurality of frequencies which define a frequency range.

7. The method of producing an array of light transmitting elastic fibers in which said fibers have different resonant frequencies to provide an array responsive to a multifrequency signal, including the steps of
  (a) coating at least a portion of a plurality of light transmitting flexible fibers with a compatible plastic wax,
  (b) aligning a plurality of said coated fibers with respect to each other,
  (c) forming said aligned fibers into an integral array so that at least one set of fiber ends is free to vibrate for different parts of their lengths in response to a plurality of frequencies.

8. The method of making a unitary assembly of light-transmitting fibers arranged in a prescribed geometrical pattern and individually having a preselected frequency response differing from that of others, said method comprising the steps of arranging a plurality of fibers in bundle-like fashion in relatively spaced, generally parallel relationship and forming a base support for holding the fibers as a unitary structure in said relationship and with the fibers extending from said support at unequal free lengths whereby they may vibrate at individual preselected frequencies, said base being formed by bonding the fibers together by the base material while the fibers are maintained in said relationship to form a three-dimensional unitary base structure and simultaneously forming in said bonding operation the surface of the resulting base structure from which said fibers protrude of such configuration as to define at least in part the dissimilar and preselected vibratory free lengths of the individual fibers.

9. The method of making a unitary assembly of light-transmitting fibers arranged in a prescribed geometrical pattern and individually having a preselected frequency response differing from that of others, said method comprising the steps of arranging a plurality of fibers in bundle-like fashion in relatively spaced, generally parallel relationship and forming a base support for holding the fibers as a unitary structure in said relationship and with the fibers extending from said support at unequal free lengths whereby they may vibrate at individual preselected frequencies, said base being formed by flowing a molding material between the fibers while they are maintained in said relationship and forming the surface of the molding material from which said fibers protrude of such configuration as to define at least in part the dissimilar and preselected vibratory free lengths of the individual fibers.

References Cited
UNITED STATES PATENTS

| | | | |
|---|---|---|---|
| 2,317,110 | 4/1943 | Person | 264—263 |
| 2,457,981 | 1/1949 | De Forest. | |
| 2,495,666 | 1/1950 | Taubart | 156—155 |
| 2,504,666 | 4/1950 | Duncan | 84—403 |
| 2,707,158 | 4/1955 | Van Issum | 117—140 |
| 2,992,516 | 7/1961 | Norton. | |
| 2,995,970 | 8/1961 | Hicks et al. | |
| 2,996,419 | 9/1961 | Schmick | 156—155 |
| 3,004,368 | 10/1961 | Hicks. | |

EARL M. BERGERT, *Primary Examiner.*

JACOB STEINBERG, *Examiner.*

W. POWELL, J. P. MELOCHE, *Assistant Examiners.*